United States Patent
Brandin et al.

[15] 3,643,754
[45] Feb. 22, 1972

[54] APPARATUS FOR COOLING A LIQUID

[72] Inventors: Tore Brandin; Sven Yngve David Johansson, both of Norrkoping, Sweden

[73] Assignee: Stal Refrigeration Aktiebolag, Norrkoping, Sweden

[22] Filed: Feb. 18, 1970

[21] Appl. No.: 12,404

[30] Foreign Application Priority Data

Feb. 21, 1969 Sweden....................................2411/69

[52] U.S. Cl......................................62/196, 62/278, 62/394
[51] Int. Cl........................................................F25b 41/00
[58] Field of Search....................................62/196, 278, 394

[56] References Cited

UNITED STATES PATENTS

| 3,481,151 | 12/1969 | Seeley | 62/196 |
| 3,435,627 | 4/1969 | Castillo | 62/394 X |

Primary Examiner—Meyer Perlin
Assistant Examiner—Ronald C. Capossela
Attorney—Munson & Fiddler

[57] ABSTRACT

An apparatus for cooling liquids comprising a compressor connected to an evaporator, the evaporator having a double-coil, the inner coil thereof being composed of a metallic material, the outer coil surrounding the inner coil and said outer coil being composed of a nonmetallic resilient insulating material such as plastic or rubber. Spacing provided between the inner and outer coils constitutes a passage for a cooling liquid. Means is provided for introducing hot gas from the high-pressure side of the apparatus to the low-pressure side, that is before the evaporator and after the evaporator. A solenoid valve controlled by a thermostat or pressurestat is used for the regulation of temperature.

2 Claims, 1 Drawing Figure

PATENTED FEB 22 1972
3,643,754
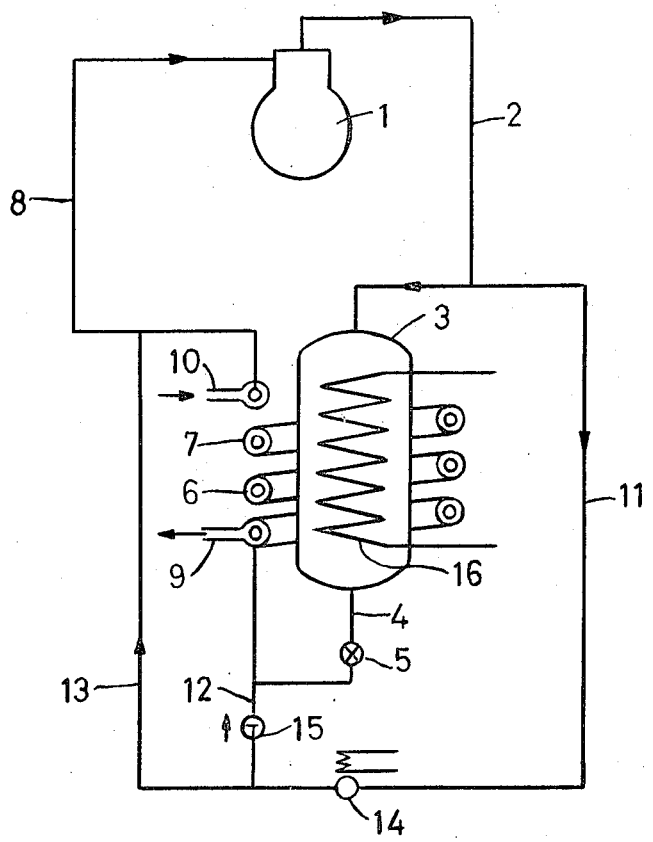
INVENTORS,
Tore Brandin & Sven Yngve David Johansson
BY Enenson & Fiddler
Attorneys

APPARATUS FOR COOLING A LIQUID

BACKGROUND OF THE INVENTION

When cooling liquids such as water, saline solutions, glycol solutions and the like it is often desirable to cool the liquid to a temperature that is close to that at which the liquid will begin to freeze and thus change into a solid state. This requires accurate control of the cooling effect or regulation of the temperature as well as the provision of devices to prevent damage in the event of a fault, particularly if the liquid should freeze with the consequent risk of clogging and bursting of the cooler.

A known method of solving this problem is to use coils of tubing within a tank containing the liquid and in which space between the coils is made generous enough to allow for the freezing on the pipes. Such a system requires a large amount of space.

If a heat exchanger is used and in which the liquid flows in a relatively narrow space between metal walls, accurate control of the cooling effect and the evaporating temperature is required as well as the provision of a safety device that will halt the operation of the apparatus if the temperature of the liquid begins to approach its freezing point. For the reliable operation of ordinary commercial equipment it is necessary for the lowest permissible temperature of the liquid to be several degrees above the freezing point, that is at least 5° C. If milk, for example, is to be cooled to 4° C. it is too risky to use water as a coolant since the temperature of the water cannot really be above 2° C. in order to bring about an exchange of heat in a heat exchanger.

It is therefore an object of the invention to provide a relatively simple nd effective means by which the liquid in a cooling apparatus can be cooled to a desired temperature and to one close to freezing, without the risk of damage to the device such as might be caused by clogging or freezing.

Reference is to be had to the accompanying drawing in which he FIGURE shown discloses diagrammatic view of an apparatus made in accordance with the invention.

DESCRIPTION

From the compressor indicated at 1, the refrigerant gas is carried by means of a line or pipe 2 to a water cooled condenser 3. The condensed refrigerant liquid is carried y a line or pipe through an expansion valve 5 to an evaporator of double coil type such evaporator having an inner pipe 6 that is composed of metal. This pipe is enclosed or surrounded by an outer pipe 7 spaced from the inner pipe so that spacing is provided between the pipes. The outer pipe 7 is composed of a resilient nonmetallic material such as plastic or rubber or other material of similar characteristics. In the arrangement described, the pipes of the evaporator are arranged in the form of a spiral coil that is disposed around the centrally located condenser 3, such an arrangement resulting in the production of a compact unit that results in a considerable saving of space. By means of a line or pipe 8 the refrigerant gas returns to the compressor. The cooled liquid is carried from the spacing between the pipes of the coil, by means of a line or pipe 9 to a heat exchanger and returns by means of line or pipe 10.

In order to regulate the cooling effect and to prevent the compressor, when under partial load, from growing too hot or too cold, a line 11 is included for introducing hot gas from the high-pressure side to the low-pressure side, before or in advance of the evaporator by means of the line 12 and after the evaporator by means of the line 13. Located in the line 11 is a solenoid valve 14 controlled by a thermostat or pressurestat. A nonreturn valve is shown at 15 in the line 12. At 16 is shown a coil of tubing for the cooling water.

The outer coil or pipe 7 that is composed of a nonmetallic material as heretofore mentioned, constitutes insulation or partial insulation around the evaporator 6.

What is claimed is:

1. In a refrigerating apparatus for cooling liquid comprising a compressor, a condenser, an expansion means and a tubular evaporator for receiving the expanded refrigerant medium from the expansion means, tubular means extending coaxially around said evaporator and spaced therefrom to form a passage for the liquid to be cooled, passage means bypassing the condenser for passing hot gas from the high-pressure side of the compressor to said evaporator, additional means bypassing said evaporator and said tubular means for passing said hot gas to the low-pressure side of the compressor and means for regulating the passage of said hot gas through said passage means.

2. A refrigerating apparatus according to claim 1 in which the surrounding tubular means provides heat insulation for the said evaporator.

* * * * *